(12) United States Patent
Hudgins

(10) Patent No.: US 8,186,891 B2
(45) Date of Patent: May 29, 2012

(54) EMBEDDED PARAMETRIC MONITORING OF OPTOELECTRONIC MODULES

(75) Inventor: Clay E. Hudgins, Madison, AL (US)

(73) Assignee: Emcore Corporation, Albuquerque, NM (US)

( * ) Notice: Subject to any disclaimer, the term of this patent is extended or adjusted under 35 U.S.C. 154(b) by 419 days.

(21) Appl. No.: 12/437,815

(22) Filed: May 8, 2009

(65) Prior Publication Data

US 2009/0220248 A1 Sep. 3, 2009

Related U.S. Application Data

(63) Continuation-in-part of application No. 11/944,969, filed on Nov. 26, 2007, now Pat. No. 7,534,054, which is a continuation of application No. 11/499,120, filed on Aug. 4, 2006, now abandoned.

(51) Int. Cl.
*G02B 6/36* (2006.01)
*H04B 10/00* (2006.01)
*H04B 10/08* (2006.01)

(52) U.S. Cl. .......................................... 385/92; 398/139

(58) Field of Classification Search .................. 398/135, 398/139
See application file for complete search history.

(56) References Cited

U.S. PATENT DOCUMENTS

| | | | |
|---|---|---|---|
| 4,965,744 A | 10/1990 | Wagatsuma et al. |
| 5,299,201 A | 3/1994 | Carusone, Jr. et al. |
| 6,141,350 A | 10/2000 | Mahale et al. |
| 6,618,392 B1 | 9/2003 | Bray |
| 6,826,358 B2 | 11/2004 | Partynski et al. |
| 6,912,361 B2 | 6/2005 | Aronson et al. |
| 6,941,077 B2 | 9/2005 | Aronson et al. |
| 6,950,865 B1 | 9/2005 | Depaolantonia |
| 6,952,531 B2 | 10/2005 | Aronson et al. |
| 6,957,021 B2 | 10/2005 | Aronson et al. |
| 6,987,932 B2 | 1/2006 | Brezina et al. |
| 6,993,686 B1 | 1/2006 | Groenendaal et al. |
| 7,035,300 B2 | 4/2006 | Stewart et al. |
| 7,050,720 B2 | 5/2006 | Aronson et al. |
| 7,058,310 B2 | 6/2006 | Aronson et al. |
| 7,079,775 B2 | 7/2006 | Aronson et al. |
| 7,113,852 B2 | 9/2006 | Kapadia et al. |
| 7,149,430 B2 | 12/2006 | Hosking et al. |
| 7,162,160 B2 | 1/2007 | Aronson et al. |
| 7,184,668 B2 | 2/2007 | Aronson et al. |
| 7,200,337 B2 | 4/2007 | Hosking et al. |
| 7,302,186 B2 | 11/2007 | Light et al. |
| 7,346,278 B2 | 3/2008 | Aronson et al. |
| 7,493,525 B2 | 2/2009 | Wigley et al. |
| 7,835,642 B2 * | 11/2010 | Nelson et al. .................. 398/23 |
| 2004/0136708 A1 | 7/2004 | Woolf et al. |
| 2004/0136720 A1 | 7/2004 | Mahowald et al. |
| 2004/0197101 A1 | 10/2004 | Sasser et al. |
| 2005/0196111 A1 | 9/2005 | Burdick et al. |
| 2006/0067358 A1 | 3/2006 | Moriwaki et al. |
| 2006/0067368 A1 | 3/2006 | Ballester et al. |
| 2006/0069822 A1 | 3/2006 | Moriwaki et al. |

(Continued)

*Primary Examiner* — Omar Rojas

(57) ABSTRACT

An optoelectronic module for converting and coupling an information-containing electrical signal with an optical fiber including a housing having an electrical input for coupling with an external electrical cable or information system device and for transmitting and receiving information-containing electrical signals over such input, and a fiber optic connector adapted for coupling with an external optical fiber for transmitting and receiving an optical signal; an electro-optic subassembly coupled to the information containing electrical signal and converting it to and/or from a modulated optical signal corresponding to the electrical signal; and parametric storage means disposed in said housing for storing environmental and/or operational data associated with the module, and an optional method for time-biased lossy compression of such stored data.

25 Claims, 1 Drawing Sheet

U.S. PATENT DOCUMENTS

| | | |
|---|---|---|
| 2006/0069905 A1 | 3/2006 | Moriwaki et al. |
| 2006/0269283 A1 | 11/2006 | Iwadate |
| 2007/0016835 A1 | 1/2007 | Hronik et al. |
| 2007/0092257 A1 | 4/2007 | Smith et al. |
| 2007/0140690 A1 | 6/2007 | Aronson et al. |
| 2007/0263713 A1 | 11/2007 | Aronson |

* cited by examiner

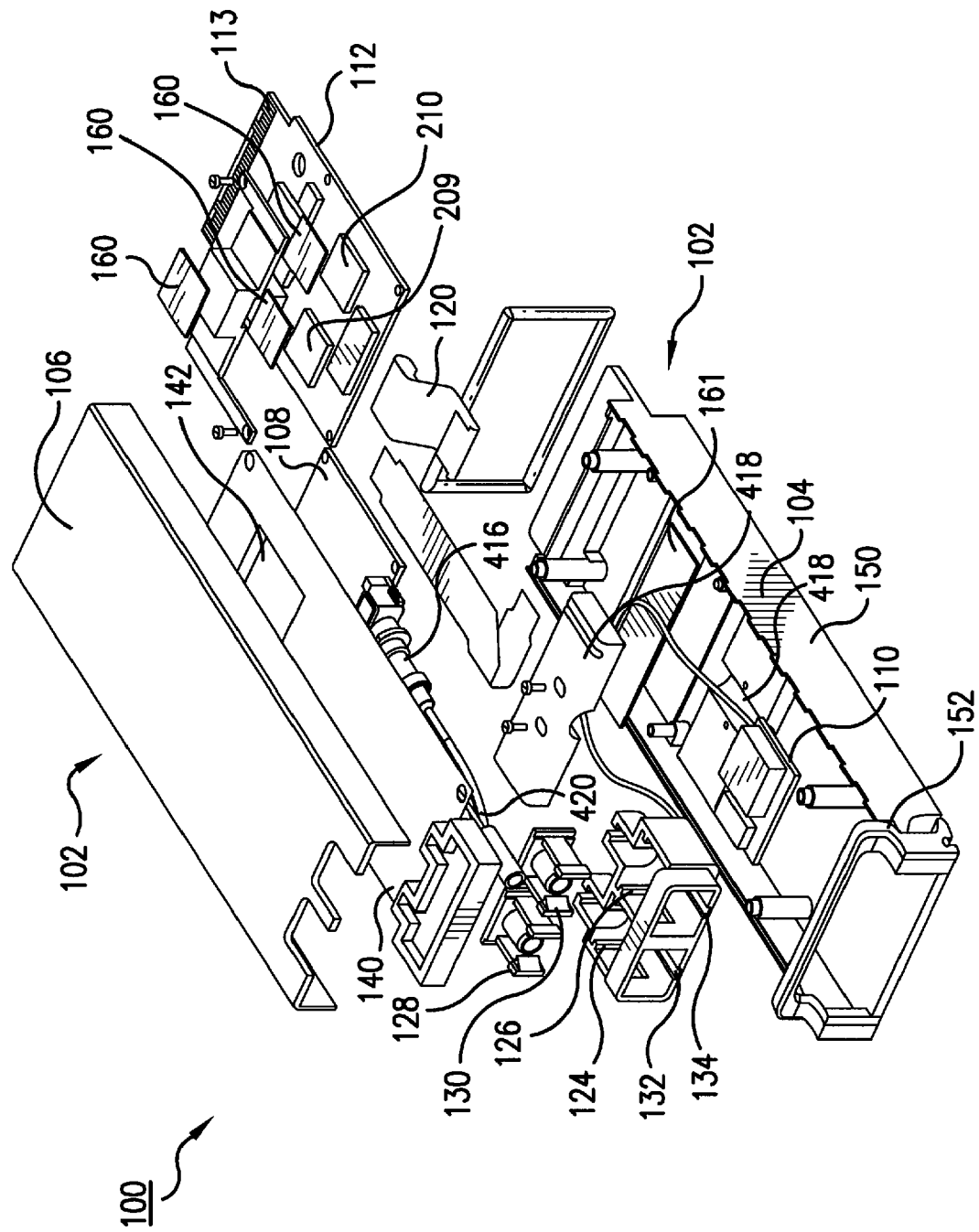

EMBEDDED PARAMETRIC MONITORING OF OPTOELECTRONIC MODULES

REFERENCE TO RELATED APPLICATIONS

This application is a continuation-in-part of U.S. patent application Ser. No. 11/944,969 filed on Nov. 26, 2007, which itself is a continuation of U.S. patent application Ser. No. 11/499,120 filed on Aug. 4, 2006, each of which is incorporated herein in their entireties.

BACKGROUND OF THE INVENTION

1. Field of the Invention

The invention relates to optical communications devices, such as transmitters, receivers, and transceivers used in high throughput fiber optic communications links in local and wide area networks and storage networks, and in particular to parametric monitoring of the performance of such devices.

2. Description of the Related Art

Communications networks have experienced dramatic growth in data transmission traffic in recent years due to worldwide Internet access, e-mail, and e-commerce. As Internet usage grows to include transmission of larger data files, including content such as full motion video on-demand (including HDTV), multi-channel high quality audio, online video conferencing, image transfer, and other broadband applications, the delivery of such data will place a greater demand on available bandwidth. The bulk of this traffic is already routed through the optical networking infrastructure used by local and long distance carriers, as well as Internet service providers. Since optical fiber offers substantially greater bandwidth capacity, is less error prone, and is easier to administer than conventional copper wire technologies, it is not surprising to see increased deployment of optical fiber in data centers, storage area networks, and enterprise computer networks for short range network unit to network unit interconnection.

Such increased deployment has created a demand for electrical and optical transceiver modules that enable data system units such as computers, storage units, routers, and similar devices to be optionally coupled by either ran electrical cable or an optical fiber to provide a high speed, short reach (less than 50 meters) data link within the data center.

A variety of optical transceiver modules are known in the art to provide such interconnection that include an optical transmit portion that converts an electrical signal into a modulated light beam that is coupled to a first optical fiber, and a receive portion that receives a second optical signal from a second optical fiber and converts it into an electrical signal. The electrical signals are transferred in both directions over an electrical connectors that interface with the network unit using a standard electrical data link protocol.

The optical transmitter section includes one or more semiconductor lasers and an optical assembly to focus or direct the light from the lasers into an optical fiber, which in turn, is connected to a receptacle or connector on the transceiver to allow an external optical fiber to be connected thereto using a standard SC, FC or LC connector. The semiconductor lasers are typically packaged in a hermetically sealed can or similar housing in order to protect the laser from humidity or other harsh environmental conditions. The semiconductor laser chip is typically a distributed feedback (DFB) laser with dimensions a few hundred microns to a couple of millimeters wide and 100-500 microns thick. The package in which they are mounted typically includes a heat sink or spreader, and has several electrical leads coming out of the package to provide power and signal inputs to the laser chips. The electrical leads are then soldered to the circuit board in the optical transceiver. The optical receive section includes an optical assembly to focus or direct the light from the optical fiber onto a photodetector, which in turn, is connected to a transimpedance amplifier/limiter circuit on a circuit board. The photodetector or photodiode is typically packaged in a hermetically sealed package in order to protect it from harsh environmental conditions. The photodiodes are semiconductor chips that are typically a few hundred microns to a couple of millimeters wide and 100-500 microns thick. The package in which they are mounted is typically from three to six millimeters in diameter, and two to five millimeters tall and has several electrical leads coming out of the package. These electrical leads are then soldered to the circuit board containing the amplifier/limiter and other circuits for processing the electrical signal.

Optical transceiver modules are therefore packaged in a number of standard form factors which are "hot pluggable" into a rack mounted line card network unit or the chassis of the data system unit. Standard form factors set forth in Multiple Source Agreements provide standardized dimensions and input/output interfaces that allow devices from different manufacturers to be used interchangeably. Some of the most popular MSAs include XENPAK (see www.xenpak.org), X2 (see www.X2 msa.org), SFF ("small form factor"), SFP ("small form factor pluggable"), XFP ("10 Gigabit Small Form Factor Pluggable", see www.XFPMSA.org), and the 300-pin module (see www.300pinmsa.org).

Customers and users of modules are interested in such miniaturized transceivers in order to increase the number of interconnections or port density associated with the network unit, such as, for example in rack mounted line cards, switch boxes, cabling patch panels, wiring closets, and computer I/O interfaces.

The reliability of such modules is an important consideration in the selection of specific designs for many commercial applications. When a module fails, users typically wish to know why. This interest is not a matter of idle curiosity; it is based on a generally accepted belief that knowing the root cause of a failure is an essential step in preventing recurrence of that failure. Thus, producers of optical modules expend much effort in failure analysis to determine the root cause of any failures that occur and to subsequently improve products to eliminate similar failures in the future. Such failure analysis is often very labor intensive, requiring technologists referred to as reliability analysts. Such failure analysis often requires an extensive suite of test equipment, which also represents a significant expense to the manufacturer.

The failure analysis process is relatively expensive to the manufacturer, and consequently one has an interest in conducting the analysis as efficiently as possible. Additionally, sometimes the failure is covered by a warranty, and honoring the warranty represents an expense to the manufacturer.

Conversely, sometimes the failure is a result of unduly harsh use by the user outside of normal environmental conditions, or some other circumstance that voids the warranty (such as use with incompatible equipment), and proving that the terms of the warranty have been violated can enable the manufacturer to avoid expense, particularly when the user chooses to return large quantities of product for purported warranty service.

If more information regarding the actual operational history of the optical module could be made available during the failure analysis, then determining the validity of the warranty status would be made more straightforward, and aspects of the failure analysis would be simpler. Failure analysis involves a search for information about the causes and circumstances of product failure, often by exploiting very subtle clues, and any information that can be made explicitly available to the reliability analyst has the potential to make their task more productive, effective, and efficient.

This process of failure analysis is extendable to cases in which no failure has occurred. In this case, a reliability analyst may analyze a used optical module to observe parametric shifts in performance, and the information gained may be used to define design and manufacturing process improvements to make the product even more reliable in the future. Because of the importance of reducing failures and parametric shifts in product performance, a need exists for better methods of tracking the environmental and operational conditions under which an optoelectronic module or product is used in the field, i.e. in actual customer installation.

SUMMARY OF THE INVENTION

1. Objects of the Invention

It is an object of the present invention to provide an optoelectronic module in a small pluggable standardized form factor with an embedded parametric monitoring circuit.

It is also another object of the present invention to provide a module for use in an optical fiber transmission system with means for storing total elapsed operating time, temperature, temperature change, and data transmission error rate.

It is still another object of the present invention to provide an optical transceiver with a storage unit for collecting and storing environmental and operational data at periodic time intervals.

It is still another object of the present invention to provide a feature in an optoelectronic module for storing and reporting excursions from normal environmental and operational conditions.

It is also another object of the present invention to provide an optical transceiver for use in an optical transmission system with electrical and mechanical sensors to detect, record and report abnormal operating conditions.

Some implementations may achieve fewer than all of the foregoing objects.

2. Features of the Invention

Briefly, and in general terms, the present invention provides an optical transceiver for converting and coupling an information-containing electrical signal with an optical fiber including a housing including an electrical connector for coupling with an external electrical cable or information system device and a fiber optic connector adapted for coupling with an external optical fiber, at least one electro-optical subassembly in the housing for converting between an information containing electrical signal and a modulated optical signal corresponding to the electrical signal including either a transmitter or a receiver, or both, and means for detecting and recording environmental and/or operation data associated with the module.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

BRIEF DESCRIPTION OF THE DRAWINGS

These and other features and advantages of this invention will be better understood and more fully appreciated by reference to the following detailed description when considered in conjunction with the accompanying drawings, wherein:

FIG. 1 is an exploded perspective view of an optoelectronic module in accordance with an illustrated embodiment of the invention.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

DESCRIPTION OF THE PREFERRED EMBODIMENT

Details of the present invention will now be described including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of the actual embodiment nor the relative dimensions of the depicted elements, and are not drawn to scale.

The present invention relates generally to parametric monitoring for optical communications modules such as transmitters, receivers, and transceivers used in fiber optic communications systems.

Referring now to FIG. 1, there is shown an exploded view of an exemplary pluggable optical transceiver module 100 according to a preferred embodiment of the present invention. In this particular embodiment, the module 100 is compliant with the IEEE 802.3ae 10 GBASE-LX4 Physical Media Dependent sub-layer (PMD) and is implemented in the XFP form factor having a length of 78 mm, a width of 18.35 mm, and a height of 8.5 mm. It is to be noted, however, that in other embodiments the transceiver module 100 may be configured to operate under various other standard protocols (such as Fibre Channel or SONET) and be manufactured in various alternate form factors such as XENPAK, X2, etc. The module 100 is preferably a 10 Gigabit Wide Wavelength Division Multiplexed (WWDM) transceiver having four 3.125 Gbps distributed feedback lasers that enable 300 meter transmission of an optical signal at least 300 meters over a single legacy installed multimode fiber or a distance from 10 to 40 km over a single standard single mode fiber.

The transceiver module 100 includes a two-piece housing 102 including a base 104 and a cover 106. In addition, contact strips (not shown) may be provided to ground the module to an external chassis ground as well. The housing 102 is constructed of die-case or milled metal, preferably die-cast zinc, although other materials also may be used, such as specialty plastics and the like. Preferably, the particular material used in the housing construction assists in reducing EMI.

The front end of the housing 102 includes a faceplate 131 for securing a pair of receptacles 124, 126. The receptacles, 124, 126 are configured to receive fiber optic connectors (not shown) which mate with optical plugs 128, 130 respectively. In the preferred embodiment, the connector receptacles 124, 126 are configured to receive industry standard LC duplex connectors. As such, keying channels 132, 134 are provided to ensure that the LC connectors are inserted into the receptacles 124, 126 in their correct orientation. Further, as shown in the exemplary embodiment and discussed further herein, the connector receptacle 124 is intended for an LC transmitter connector, and the connector receptacle 126 receives an LC receiver connector.

In one embodiment, the housing 102 holds three subassemblies or circuit boards, including a transmit board 108, a receive board 110, and a physical coding sublayer (PCS)/physical medium attachment (PMA) board 112, which is used to provide an electrical interface to external computer or communications units (not shown). The transmit subassembly includes four distributed feedback (DFB) semiconductor lasers mounted which may be mounted in a single, hermetically sealed enclosure 415, which interfaces to a fiber coupling subassembly 416. The transmit board 108 is secured in place at the bottom of the housing a brace 418 attached to the coupling subassembly 416. The brace also functions as a heat sink for dissipating heat from the metallic fiber coupling subassembly 416. In addition, the transmit board 108 and receive board 110 are connected to the PCS/PMA board 112 by respective flex interconnects 120, or other board-to-board electrical connectors or cables. Thermally conductive gap pads may be provided to transmit the heat generated by the lasers or other components in the transmitter subassembly to the base 104 or cover 106 of the housing, which acts as a heat sink. The receiver subassembly 110 is directly mounted on the housing base 104 using a thermally conductive adhesive to achieve heat dissipation. Different subassemblies therefore dissipate heat to different portions of the housing for a more uniform heat dissipation. The output optical signal from the four lasers is multiplexed and input into a single optical fiber 420 which coils and reverses direction, and is preferably attached or mounted on a flexible substrate 140. The flexible material may be an optical flexible planar material such as FlexPlane™ available from Molex, Inc. of Lisle, Ill., although other flexible substrate may be used as well. The optical fiber 420 originating from the transmitter subassembly is thereby routed to the transmit optical connector plug 130, which is attached to the housing 102. The fiber is routed and attached in such a manner as to minimize sharp bends in the optical fiber to avoid optical loss and mechanical failure.

The flexible substrate 140 may include an opening 142 or hole in a portion of the material that is located directly above the retimer IC or other heat generating components mounted on the PCS/PMA board 112. The opening 142, which is substantially an area the size of the unused portion of the substrate 140, enables the heat sink on the cover 106 to contact a heat transmission gap pad 160, so as to provide access and a heat conductive path to the mounted components on the board 112. This area on the board 112 normally would be inaccessible if not for the opening 142. For example, a heat sink may be installed without interfering with the routing of the optical fibers on the substrate 140 and without removing the mounted substrate 140 to allow access to the PCS/PMA board 112.

Although the embodiment described above is a pluggable 10 Gigabit WWDM transceiver, the same principles are applicable in other types of optical transceivers suitable for operating over both multimode (MM) and single mode (SM) fiber using single or multiple laser light sources, single or multiple photodetectors, and an appropriate optical multiplexing and demultiplexing system. The design is also applicable to a single transmitter or receiver module, or a module as either a transmitter, receiver, or transceiver to communicate over different optical networks using multiple protocols and satisfying a variety of different range and distance goals.

Although in the depicted embodiment, the transceiver 100 is manufactured in a modular manner using three separate subassemblies mounted in the housing—a transmitter subassembly, a receiver subassembly, and a protocol processing board, with each subassembly or board having dedicated functions and electrically connected to each other using either flex circuitry or mating multipin connectors, land grid arrays, or other electrical interconnect devices, the invention may also be implemented in a transceiver having a single board or subassembly mounted inside the housing.

The modern optical transceiver or module, such as that of FIG. 1, as well as those complying with the XENPAK, X2, XPAK, or 300 pin form factors, possesses underutilized resources for collecting information and nonvolatile memory in which to store it. Optical modules 100 typically employ synchronous digital circuitry, which gives them the capability to measure Elapsed Run Time (ERT) in and Elapsed Run Time Meter (ERTM) as has long been done in the field of industrial-grade internal combustion engines. The present invention implements an ERTM in a digital logic circuit 209 or other means within the housing of the module 100 for recording and storing the total operating time of the optical module without a microprocessor or alternately may implement the ERTM using a clock-counter resource within an embedded microprocessor 210, depending on the hardware resources available within the optical module.

The purpose of the ERTM within the module 100 is to count and to store the number of time units the module has run since first being built and provided to the user, and to make that information available to the producer if the user should ever return the module to the producer for warranty service, or for any other reason. For the ERTM to be useful to the producer's reliability analyst, the ERTM must by default retain the ERT value in nonvolatile memory when power is removed from the optical module. Furthermore, the ERTM must by default continue counting ERT when power is once again applied to the optical module, resuming with the previous value rather than starting over from zero. In addition to the default behaviors of the ERTM, which enable autonomous operation without intervention by the user, the producer must have a means to override default ERTM behaviors for maintenance and diagnostic purposes, including the ability to reset the ERTM to zero, to read the ERTM's value, to set the ERTM to non-zero values, and to freeze (i.e., halt or stop) and restart the ERTM.

The ERTM's demands on nonvolatile storage space within the module 100 are quite modest. For example, a one-minute resolution meter with thirty years duration may be implemented in only 24 bits of nonvolatile memory (i.e., 30 years+ 365.25 days/year.times.24 hours/day.times.60 minutes/hour=15,778,800 minutes. It may be noted that 15,778,800 minutes is less than the maximum value of a 24 bit register, which may represent a maximum of $2^{24}-1$, which equals 16,777,215).

In practice, the ERTM is not constrained to measure time in conventional time units (e.g., hours, minutes, seconds). The ERTM may measure elapsed time in some local timebase, which may be a convenient multiple of the period of any synchronous digital clock employed within the optical module or some multiple of the signaling period of data passing through the module. (Often optical modules recover a digital clock signal from the received pseudorandom optical data waveform.) The necessary general purpose processing to convert the ERTM's timebase to conventional time units need not be present within the optical module, since general purpose processing capability will be conveniently available to the producer's reliability analyst.

Typically, when a user decides that a module has failed from the user's viewpoint, the failure will be related to some parameter of direct interest to the user, and that failure will likely not involve the ERTM, which is of only indirect interest to the user. When the user removes the optical module from operation, the optical module will no longer receive the electrical power required to operate, and so the ERTM will cease to run. And so, when the producer receives a failed module returned by the user, the ERTM will provide the total elapsed run time experienced by the module up to the point of failure, which is something that otherwise would impossible to know and difficult to estimate.

In general, a number of parameters of interest (POIs) may be collected. For example a temperature, as well as the time rate of change of temperature, of the module body or case may be collected. Similarly a temperature, as well as a time rate of change, of the laser or LED within the body or case may be collected.

Other POIs may include a laser bias or modulation current and/or the digital setting that controls it. In the case of LEDs, a POI may include the LED drive current and/or the digital setting that controls it.

Error signals may also be collected and saved as POIs. Indications of bit errors on the fiber in the optical receive function may be retained. For example, coding errors detected in received blocks data, such as 8b10B or 64b/66b blocks of data. Indications of bit errors on incoming electrical signals that stimulate the module's optical transmission function may also be retrained as POIs.

Indications of lower optical power in the optical receive function may be retained as a POI. For example, optical power below the receiver's specified capability or an optical power so low as to indicate a "dark" optical fiber, which sometimes referred to as a loss of signal (LOS) condition.

All other things being equal, semiconductor integrated circuits age more quickly at higher temperatures, as do organic materials. So, the history of Module Operating Temperature (MOT) will be of interest to the reliability analyst. Typically, some knowledge of temperature is available within an optical module, because, as is well known, most optical modules employ a form of temperature compensation to adjust the drive settings of the optical emitter, which is typically a laser diode or an LED (light emitting diode). Either this existing resource or some additional specialized resource may be used to measure temperature.

The knowledge of time and temperature may together be used to measure the time-rate-of-change of temperature, which may be of interest since rapid temperature changes tend to be more stressful than slow changes. Additionally if desired, sensors may be added to measure mechanical stresses such as mechanical shock or mechanical strain. Additional Parameters Of Interest (POI) may include internal settings specific to the optical module's design, such as digital potentiometer settings, laser drive settings, operational modes, et cetera.

Also of interest are the issues surrounding how to efficiently store the measured data within the module 10. The nonvolatile memory available in the optical module is a finite resource, and to make the most efficient use of the memory, the stored data should be compressed in some way. Lossless data compression techniques are well known, and certainly may be employed. Additionally, these data are highly suitable for lossy compression, because the measurements are not all of equal value.

For example, the maximum and minimum values of a given POI (e.g., temperature, shock, etc.) represent particularly valuable information, and dedicated storage locations may be allocated for those values. The time values at which such maxima and minima occur are important information, and so it is desirable to store ERT and these values as ordered pairs, such as {ERT, POI-maxima} and {ERT, POI-minima}, and these time-measurement pairs are called time-tagged data. If available memory is severely limited, then these time-tagged pairs of maxima and minima for each POI together with overall elapsed run time will provide a great deal of useful information for reliability analysis. More generally, dedicated storage registers may be allocated for time-tagged pairs of the N highest values (N=1, 2, 3, ...) and M lowest values (M=1, 2, 3, ...) of some or all of these POI. Table 1 depicts a data structure showing such time-tagged data. The POI entries are called Type-1 for generality, and could be any POI as previously discussed, and the producer may choose to record several POI types in practice.

TABLE 1

Example of Data Structure Containing Time-tagged POI Type-1 Values

| POI Type-1 Value | Time-Tag |
|---|---|
| Highest Observed Value | ERT Value at Observation Time |
| 2nd Highest Observed Value | ERT Value at Observation Time |
| 3rd Highest Observed Value | ERT Value at Observation Time |
| ... | ... |
| Nth Highest Observed Value | ERT Value at Observation Time |
| Lowest Observed Value | ERT Value at Observation Time |
| 2nd Lowest Observed Value | ERT Value at Observation Time |
| 3rd Lowest Observed Value | ERT Value at Observation Time |
| ... | ... |
| Mth Lowest Observed Value | ERT Value at Observation Time |

Recording an exhaustive history of all measured values of POI could require so much memory as to be uneconomical to store within an optical module. However, for the purposes of failure analysis, the POI values in the time period closest to failure are of special interest. So, dedicated registers may be allocated to store a series of L (L=1, 2, 3, ... up to some maximum set by the design) time-sequential measurements of POI, with the oldest measurement being discarded, thus implementing a time-biased lossy compression scheme that favors the more recent values. These L measurements may be stored at equal time intervals in the local timebase (e.g., once per minute), or stored in a manner corresponding to predefined unequal time intervals, as will be explained below. These measurements may be time-tagged in a similar fashion to that of Table 1, but such time-tagging is not necessary for every element of the series of measurements. The final ERT value provides a single time-tag that, when combined with the producer's a priori knowledge of the storage sequence, provides sufficient information for the producer's reliability analyst to use external general purpose processing capabilities to calculate the ERT value associated with each individual measurement in the sequence.

As an example of implementation of predefined unequal storage intervals, let $T_o$ be a time interval in the optical module's local timebase, and let P, Q, R, and S be positive nonzero integers. Then, one implementation is to store a POI value once every T.sub.o interval into the first one of a set of P memory registers, shifting the older values in the remaining P memory registers on a first-in first-out (FIFO) basis, discarding the oldest measurements such that only a quantity of P of the POI measurements are retained.

Then once every P of these T.sub.o time intervals, store the average of the values currently in the set of quantity-P registers into the first element of a set Q registers, shifting the older values in the remaining Q memory registers on a FIFO basis, discarding the oldest value so that only a quantity of Q of such values are retained.

Then once every P.times.Q of these T.sub.o time intervals, store the average of the values currently in the set of quantity-Q registers into the first element of a set of R registers, shifting the older values in the remaining R memory registers on a FIFO basis, discarding the oldest value so that only a quantity of R of such values are retained.

Then once every P.times.Q.times.R of these T.sub.o time intervals, store the average of the values currently in the set of quantity-R registers into the first element of a set of S registers, shifting the older values in the remaining S memory registers on a FIFO basis, discarding the oldest value so that only a quantity of S of such values are retained.

Of course, this progressive averaging may be extended to arbitrarily many steps, and instead of using the individually named indexes P, Q, R, S, one would establish an index series such as P.sub.1, P.sub.2, P.sub.3, . . . P.sub.N for arbitrarily large N. Note that an average taken over several composite averages is equal to the average of the individual elements taken separately, as indicated in Equation 1, below, for the specific case of a three-level composite average. So, the averages-of-averages stored in the composite tables (e.g., in Tables 2c, 2d, and 2e, below) simply represent the average value of the POI for the corresponding time period.

$$\sum_{k=1}^{P_3} \frac{1}{P_3} \left[ \frac{1}{P_2} \sum_{j=1}^{P_2} \left[ \frac{1}{P_1} \sum_{i=1}^{P_1} x_i \right]_j \right]_k = \sum_{m=1}^{P_1 \cdot P_2 \cdot P_3} \frac{x_m}{P_1 \cdot P_2 \cdot P_3} \quad \text{Equation 1}$$

As a numeric example, an optical module transferring data at 10 gigabits per second will typically have an internal digital clock signal at some sub-multiple of the data rate, for example at 50 MHz, and a T.sub.o of one minute may then be conveniently measured by counting three billion cycles of that 50 MHz clock. Then, setting P=11, Q=7, R=5, and S=3, and calculating the various time values produces the example of Tables 2a, 2b, 2c, 2d, and 2e.

Note: Tables 2b-2e display time rounded-off to the nearest minute. Movements and manipulation of the data within the tables are synchronized to the 50 MHz digital clock, which has a period of one three billionth of a minute, and the negligible rounding error imposed by ignoring the data transition time between registers is of that order of magnitude.

TABLE 2a

Example Variable Values

| Variable | Value | Unit |
|---|---|---|
| P | 11 | A unitless integer |
| Q | 7 | A unitless integer |
| R | 5 | A unitless integer |
| S | 3 | A unitless integer |
| $T_o$ | 1 | Minutes |

TABLE 2b

An Example P-Table.

| Index (Ranges from 1 to P) | Maximum Age in Minutes | Entry |
|---|---|---|
| 1 | 1 | Most recent POI measurement, 0 to 1 minutes old. |
| 2 | 2 | POI measurement, 1 to 2 minutes old. |
| 3 | 3 | POI measurement, 2 to 3 minutes old. |
| 4 | 4 | POI measurement, 3 to 4 minutes old. |
| 5 | 5 | POI measurement, 4 to 5 minutes old. |
| 6 | 6 | POI measurement, 5 to 6 minutes old. |
| 7 | 7 | POI measurement, 6 to 7 minutes old. |
| 8 | 8 | POI measurement, 7 to 8 minutes old, |
| 9 | 9 | POI measurement, 8 to 9 minutes old. |
| 10 | 10 | POI measurement, 9 to 10 minutes old. |
| 11 | 11 | POI measurement, 10 to 11 minutes old. |

Note
The most recent POI value enters at the top of the table, and all entries are pushed down the table once every $T_o$ = 1 minute period, with the very oldest entry being discarded.

TABLE 2c

Example of the Q-Table

| Index (Ranges from 1 to Q) | Maximum Age in Minutes | Entry |
|---|---|---|
| 1 | 11 | Average of the 11 P-Table Entries, created 0 to 11 minutes ago. |
| 2 | 22 | Average of the 11 P-Table Entries, created 11 to 22 minutes ago. |
| 3 | 33 | Average of the 11 P-Table Entries, created 22 to 33 minutes ago. |
| 4 | 44 | Average of the 11 P-Table Entries, created 33 to 44 minutes ago. |
| 5 | 55 | Average of the 11 P-Table Entries, created 44 to 55 minutes ago. |
| 6 | 66 | Average of the 11 P-Table Entries, created 55 to 66 minutes ago. |
| 7 | 77 | Average of the 11 P-Table Entries, created 66 to 77 minutes ago. |

Note
Every P x $T_o$ = 11 minutes, the values of the P-Table are averaged and placed at the top of this Q-Table, and all older values are pushed down, with the very oldest entry being discarded.

TABLE 2d

Example of the R-Table

| Index (Ranges from 1 to R) | Maximum Age in Minutes | Entry |
|---|---|---|
| 1 | 77 | Average of the 7 Q-Table Entries, created 0 to 77 minutes ago. |
| 2 | 154 | Average of the 7 Q-Table Entries, created 77 to 154 minutes ago. |
| 3 | 231 | Average of the 7 Q-Table Entries, created 154 to 23 minutes ago. |
| 4 | 308 | Average of the 7 Q-Table Entries, created 231 to 308 minutes ago. |
| 5 | 385 | Average of the 7 Q-Table Entries, created 308 to 385 minutes ago. |

Note
Every P x Q x $T_o$ = 77 minutes, the values of the Q-Table are averaged and placed at the top of this R-Table, and all older values are pushed down, with the very oldest entry being discarded.

TABLE 2e

Example of the S-Table

| Index (Ranges from 1 to S) | Maximum Age in Minutes | Entry |
|---|---|---|
| 1 | 385 | Average of the 5 R-Table Entries, created 0 to 385 minutes ago. |
| 2 | 770 | Average of the 5 R-Table Entries, created 385 to 770 minutes ago. |
| 3 | 1155 | Average of the 5 R-Table Entries, created 770 to 1155 minutes ago. |

Note
Every $P \times Q \times R \times T_o = 385$ minutes, the values of the R-Table are averaged and placed at the top of this S-Table, and all older values are pushed down, with the very oldest entry being discarded.

This progressive averaging of averages must ultimately be terminated based on the amount of memory the producer chooses to allocate to storage of POI values and their averages. However, this lossy compression technique may be extended indefinitely in principle, and is limited only by considerations of economy.

In this way, the reliability analyst will have access to specific POI measurements in the time periods closest to time of failure, and will also have access to less specific averaged information for older POI measurements. The necessary general purpose processing to convert these measured and averaged POI data from the optical module's timebase to minutes need not be present within the optical module, since general purpose processing capability will be conveniently available to the producer's reliability analyst.

Some of the compression techniques give preference to the more recent measurements while still saving at least a portion of the older measurements. The memory is managed in a way that more recent data is saved using lossless data compression. The more distant data may be saved using lossy data compression. Specific embodiments for maintaining the distant data may include averaging processes, or higher-order statistical techniques known as moments about the mean. The memory may also be managed to store maximum and minimum and other specific data for an unlimited time regardless of the age of the data.

Additionally, memory registers may be allocated to store additional statistical information about each physical parameter as observed over the life of the device. For example using the nomenclature established above, dedicated registers may be allocated to store the statistical moments about the mean of the data, including variance, skew, kurtosis, and higher-order moments about the mean of each POI over quantity-P, -Q, -R, -S (and so on) of measurements. In this way, the optical module may store historical statistical information for each POI, with storage preference being given to more recent data.

For the EPMS data (including ERT and POI data structures) described above to be useful to the producer, the producer must have access to read the data after optical modules return from the user, and also must be able to write and clear the EPMS data for diagnostic purposes. For the optical module to be useful to the user, the addition of this EPMS data must not compromise or violate pre-existing standards or conventions.

Modern optical modules, such as those complying with the XENPAK, X2, XPAK, or 300 pin form factors, possess digital maintenance interfaces that in most cases may be used by the producer for access to the EPMS data. Typically, the user has pre-existing agreements with the producer allocating a set of addresses in the maintenance interface's address space for use by the producer. If the producer's selection of EPMS data will fit with this allocated address space, then the producer may use the existing digital maintenance interface for EPMS purposes in a straightforward manner.

However, if the producer's selection of EPMS data will not fit with this allocated address space, then the producer may potentially still use the limited maintenance address space to set up command and control registers by which the producer may command the optical module into a maintenance mode, outside the scope of the user's interests, to transfer EPMS data by direct memory access (DMA). Once the optical module is in maintenance mode, the producer may perform the DMA over the digital maintenance interface, or may even perform the DMA over the optical module's optical port or the high-bandwidth electrical port commonly paired with the optical port.

Conversely, the producer may choose to make EPMS data available only by partially disassembling the optical model (e.g., only by opening the optical module case). This approach has the advantage of eliminating any foreseeable user concern about EPMS impact on pre-existing understandings over use of the optical module's standard digital maintenance interface, and the disadvantage of requiring the producer to partially disassemble the optical module to access EPMS information.

The producer might also choose to implement a low-power wireless interface to access EPMS data, such as a low power radio frequency interface or a free-space optical interface such as optical infra-red. This approach would eliminate potential user concerns about pre-existing understandings about use of the standard digital maintenance interface, while also allowing the producer to access EPMS data without partial module disassembly.

And so, several approaches are available to the producer to achieve the required EPMS data access, and the producer is free to choose the option that best suits their circumstances.

Various modifications and improvements of the present invention may also be apparent to those of ordinary skill in the art. Thus, the particular combination of sensors and data storage elements described and illustrated herein is intended to represent only certain embodiments of the present invention, and is not intended to serve as limitations of alternate devices within the spirit and scope of the invention. Various aspects of the techniques and apparatus associated with the sensing, processing, storing, and reporting aspects of the invention may be implemented in a digital circuitry, or in computer hardware, firmware, software, or in combinations of them. Apparatus of the invention may be implemented in dedicated digital logic circuitry tangibly embodied in the module, or in a machine-readable storage device for use by a programmable processor, or in software located in memory along with communications processing software used in operation of the module. The foregoing techniques may be performed, for example, single central processor, a multiprocessor, on one or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplements by or incorporated in, specifically designed application-specific integrated circuits (ASICS).

It will be understood that each of the elements described above, or two or more together, also may find a useful application in other types of constructions differing from the types described above.

While the invention has been illustrated and described as embodied in a transceiver for an optical communications network, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is:

1. In an optical transmitter for converting and coupling an information-containing electrical signal with an optical fiber comprising: a housing including an electrical input for coupling with an external electrical cable or information system device and for transmitting information-containing electrical signals over said input, and a fiber optical connector adapted for coupling with an external optic fiber for transmitting an optical signal; an electro-optic subassembly disposed in said housing coupled to the information containing electrical signal and converting it to a modulated optical signal corresponding to the electrical signal at a predetermined wavelength; a method comprising:

acquiring, at a sequence of time intervals, operational data associated with the transmitter to store said operational data acquired during said sequence of time intervals in a non-volatile memory disposed in said housing;

tracking and storing an elapsed time while the transmitter is operational;

accessing said non-volatile memory to determine the stored operational data; and during at least one of maintenance and diagnostics, overriding default behaviors established for tracking and storing the elapsed time.

2. A method as defined in claim 1, further comprising decoupling said optical transmitter from said external electrical cable or information system device prior to accessing said non-volatile memory.

3. A method as defined in claim 1, further comprising compressing said operation data prior to it being stored in the non-volatile memory.

4. A method as defined in claim 1, further comprising storing the elapsed time and corresponding operational data as ordered pairs.

5. A method as defined in claim 1, wherein acquiring operational data associated with the transmitter includes acquiring a time rate of change of temperature of at least one of the housing and the electro-optic subassembly.

6. A method as defined in claim 1, further comprising calculating and storing statistical moments about a mean of the operational data.

7. A method as defined in claim 1, further comprising acquiring and storing indications of bit errors on incoming inputs.

8. A method as defined in claim 1, wherein overriding the default behaviors includes resetting the elapsed time to zero.

9. A method as defined in claim 1, wherein overriding the default behaviors includes setting the elapsed time to a non-zero value.

10. A method as defined in claim 1, wherein overriding the default behaviors includes stopping the tracking the elapsed time while the transmitter is operational and subsequently tracking and storing the elapsed time again.

11. A method as defined in claim 1, further comprising using a combination of lossless data compression and lossy data compression to store said operational data.

12. In an opto-electrical module for converting and coupling information-containing signals with an optical fiber, a method of storing operational information about the opto-electrical module for failure analysis comprising:

tracking an elapsed run time that the module is operational; storing the elapsed run time;

periodically acquiring a parameter of interest associated with the module while the module is operational and storing the parameter of interest; and during at least one of maintenance and diagnostics of the module, accessing at least one of the stored elapsed run time and the parameter of interest and overriding default behavior for the tracking and storing of the elapsed run time.

13. A method as defined in claim 12, wherein overriding the default behavior includes stopping the tracking and the storing of the elapsed run time during the at least one of maintenance and diagnostics of the module and subsequently restarting the tracking and the storing of the elapsed run time after the at least one of maintenance and diagnostics has ended.

14. A method as defined in claim 12, wherein overriding the default behavior includes clearing from memory at least one of the elapsed run time and the parameter of interest.

15. In an opto-electrical module for converting and coupling information-containing signals with an optical fiber, a method of storing operational information about the opto-electrical module for failure analysis comprising:

autonomously tracking an elapsed run time that the module is operational;

autonomously storing the elapsed run time in nonvolatile memory;

autonomously acquiring a parameter of interest associated with the module while the module is operational and storing the parameter of interest;

autonomously resuming tracking of the elapsed run time if power is returned to the module after power had been removed from the optical module; and overriding the autonomous tracking of the elapsed run time and the autonomous storing of the elapsed run time during at least one of maintenance and diagnostics.

16. In an optical transmitter for converting and coupling an information-containing electrical signal with an optical fiber comprising: a housing including an electrical input for coupling with an external electrical cable or information system device and for transmitting information-containing electrical signals over said input, and a fiber optical connector adapted for coupling with an external optic fiber for transmitting an optical signal; an electro-optic subassembly disposed in said housing coupled to the information containing electrical signal and converting it to a modulated optical signal corresponding to the electrical signal at a predetermined wavelength; a method comprising:

acquiring, at a sequence of time intervals, operational data associated with the transmitter, and using a lossy data compression to store said operational data acquired during said sequence of time intervals in a non-volatile memory disposed in said housing;

tracking and storing an elapsed time while the transmitter is operational;

accessing said non-volatile memory to determine the stored operational data; and during at least one of maintenance and diagnostics, overriding default behaviors established for tracking and storing the elapsed time.

17. A method as defined in claim 16, further comprising decoupling said optical transmitter from said external electrical cable or information system device prior to accessing said non-volatile memory.

18. A method as defined in claim 16, further comprising compressing said operation data prior to it being stored in the non-volatile memory.

19. A method as defined in claim 16, further comprising storing the elapsed time and corresponding operational data as ordered pairs.

20. A method as defined in claim 16, wherein acquiring operational data associated with the transmitter includes acquiring a time rate of change of temperature of at least one of the housing and the electro-optic subassembly.

21. A method as defined in claim 16, further comprising calculating and storing statistical moments about a mean of the operational data.

22. A method as defined in claim 16, further comprising acquiring and storing indications of bit errors on incoming inputs.

23. A method as defined in claim 16, wherein overriding the default behaviors established for tracking and storing the elapsed time includes resetting the elapsed time to zero.

24. A method as defined in claim 16, wherein overriding the default behaviors established for tracking and storing the elapsed time includes setting the elapsed time to a non-zero value.

25. A method as defined in claim 16, wherein overriding the default behaviors established for tracking and storing the elapsed time includes stopping the tracking the elapsed time while the transmitter is operational and subsequently tracking and storing the elapsed time again.

* * * * *